(12) United States Patent
Nishida

(10) Patent No.: US 7,275,248 B2
(45) Date of Patent: Sep. 25, 2007

(54) INFORMATION PROCESSING APPARATUS AND METHOD OF SYSTEM CONTROL OF THE APPARATUS

(75) Inventor: Yoshihiro Nishida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 257 days.

(21) Appl. No.: 11/088,530

(22) Filed: Mar. 24, 2005

(65) Prior Publication Data

US 2005/0246514 A1    Nov. 3, 2005

(30) Foreign Application Priority Data

Apr. 28, 2004    (JP)    ............................. 2004-134499

(51) Int. Cl.
*G06F 9/46*    (2006.01)
(52) U.S. Cl. ...................... 718/100; 713/324; 702/132
(58) Field of Classification Search ................ 713/324, 713/340
See application file for complete search history.

(56) References Cited

U.S. PATENT DOCUMENTS 6,845,456 B1 *    1/2005    Menezes et al. ............ 713/320
2004/0193383 A1 *    9/2004    Clabes et al. ............... 702/132

FOREIGN PATENT DOCUMENTS

JP    09-305268    11/1997

OTHER PUBLICATIONS

Real-Time Microprocessor Systems, Stephen R. Savitzky, 1985, Van Nostrand Reinhold Company Inc., ISBN: 0-442-28048-3, Glossary p. 297.*

* cited by examiner

*Primary Examiner*—David Robertson
*Assistant Examiner*—Jay R Marcyes
(74) *Attorney, Agent, or Firm*—Blakely Sokoloff Taylor & Zafman, LLP

(57) ABSTRACT

According to one embodiment of the invention, a task management section of an operating system is notified of temperature abnormality by the notification that the rotation rate of the cooling fan reaches a specified rate, it executes measures to reduce the load of the processor: for example, (1) discriminating a program that does not require real-time execution, with reference to the task management table and forcibly stopping the program; (2) discriminating a program that requires real-time execution and that is in operation in a normal status, with reference to the task management table, and simplifying or omitting a process of the program; and (3) discriminating a program of a low priority of real-time execution from the programs that require real-time execution, with reference to the task management table, and forcibly stopping the program.

10 Claims, 5 Drawing Sheets

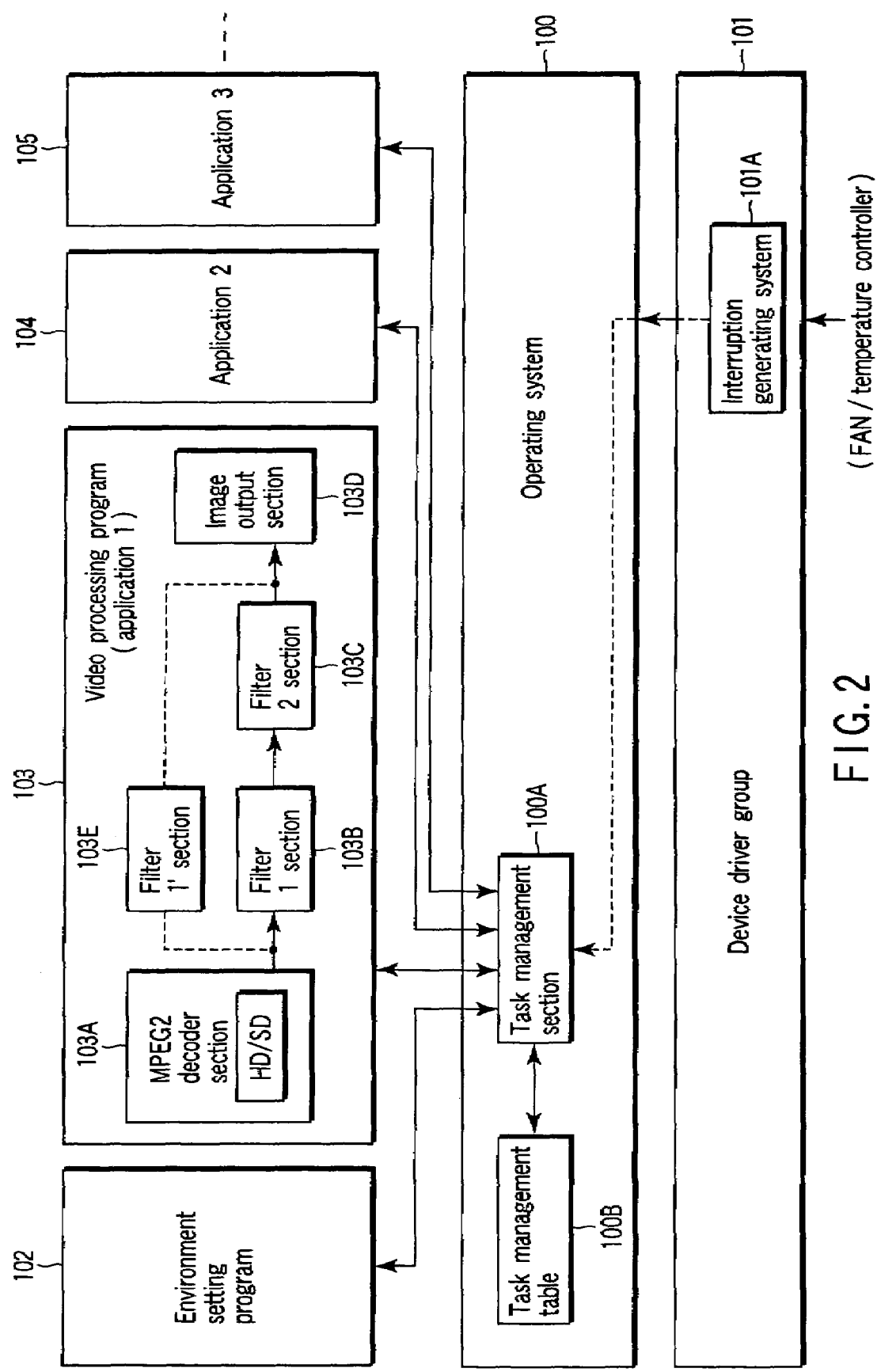
F I G. 2

100b

| Application ID | Real-time execution | Priority | Status |
|---|---|---|---|
| Application 1 | ○ | 1 | SD |
| Application 2 | × | — | sleep |
| Application 3 | ○ | 2 | sleep |
| ⋮ | ⋮ | ⋮ | ⋮ |

F I G. 3

<FAN / temperature control setting screen> ~150

⦿ Mode setting
 ○ Daytime mode
 ⦿ Nighttime mode   ~200

○ Time zone setting
 Nighttime mode time zone
 Start [hh:mm]
  ⟨
 End [hh:mm]   ~210

F I G. 4

INFORMATION PROCESSING APPARATUS AND METHOD OF SYSTEM CONTROL OF THE APPARATUS

CROSS-REFERENCE TO RELATED APPLICATIONS

This application is based upon and claims the benefit of priority from the prior Japanese Patent Application No. 2004-134499, filed Apr. 28, 2004, the entire contents of which are incorporated herein by reference.

BACKGROUND

1. Field

Embodiments of the present invention relate to a technique of system control of an information apparatus, which executes image processing with software, including decoding, and more particularly to a system control technique, which can handle a temperature abnormality of a processor with an appropriate software control in consideration of the convenience of the user.

2. Description of the Related Art

In recent years, as semiconductor manufacturing and information processing techniques have improved, the use of software application have expanded. Software is not limited to certain types of information processing apparatuses, such as personal computers and PDAs, but has been extended to other types of information processing apparatuses such as, for example, digital television sets. Further, since the contents processed by software have been more and more complicated, heat generated by a processor has been increasing. Therefore, it is very important to consider how to handle the heat.

For example, Jpn. Pat. Appln. KOKAI Publication No. 9-305268 discloses an information processing system, in which a rise in temperature of a semiconductor chip is dealt with in stages as follows: (1) the wind velocity of a cooling fan is increased; (2) a dummy operation is inserted to lower the operation speed of the system; and (3) the operation frequency or power supply is lowered.

Conventionally, there has been a demand to suppress noise (rotation sound of the cooling fan) to a minimum, for example, late at night. Recently, in addition, there have been many cases in which software carries out a process which requires real-time execution, such as image processing to receive and play back a television broadcast.

Under these circumstances, the control in handing heat generated by the processor, for example, increase of the wind velocity of the cooling fan, should be performed in consideration of the situation that changes every moment.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing an exemplary configuration of software operated in the digital television set of the embodiment;

FIG. 3 is a diagram showing an exemplary configuration of a task management table contained in the digital television set of the embodiment;

FIG. 4 is a diagram showing an exemplary setting screen presented by an environment setting program, which is operated in the digital television set of the embodiment;

DETAILED DESCRIPTION

Described below is an embodiment in which the present invention is applied to a digital television set (e.g., one type of information processing apparatus). Herein, certain terminology is used to describe features or functionality of the invention. For example, the term "section: is generally defined as software and/or hardware to perform a particular function.

Figure 1:
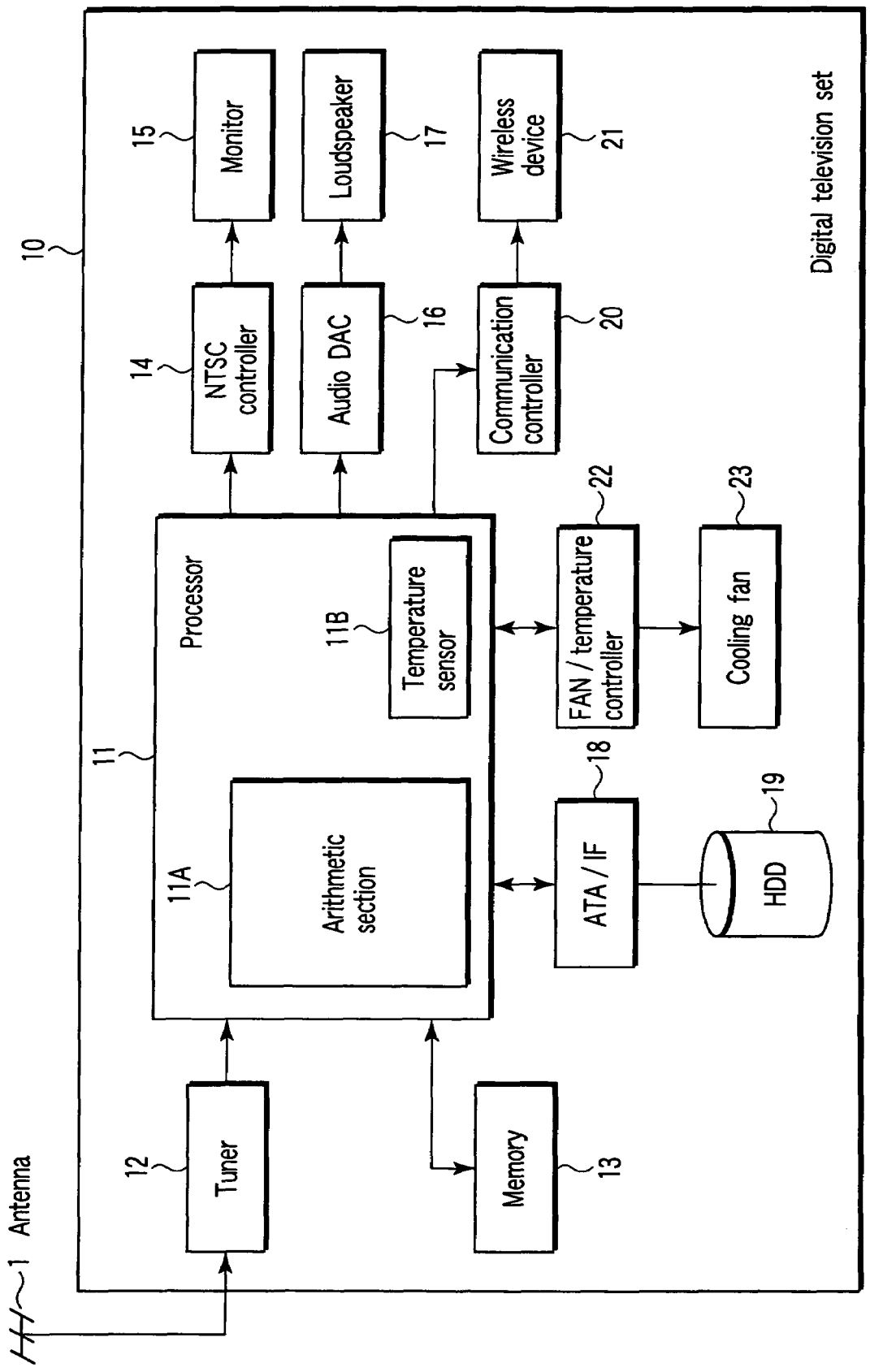
FIG. 1 is a block diagram showing an exemplary structure of an information processing apparatus (digital television set) according to an embodiment of the present invention.

FIG. 1 is a block diagram showing an exemplary structure of a digital television set 10 according to an embodiment of the present invention. The digital television set 10 is adapted with a television (TV) function; namely, the digital television set 10 operates to receive encoded program data of a television broadcast through an antenna 1 or other input source (e.g., cable, terrestrial signal, etc.), decodes the received program data and plays back the program data. In addition, the digital television set 10 is adapted with (i) a TV recording function by recording the received program data in a hard disk drive (HDD) 19, and (ii) a wireless TV function transmitting program data to, for example, an information processing apparatus (e.g., personal computer) in another room via a wireless device 21. The digital television set 10 realizes these functions by software through arithmetic processing executed by a processor 11, i.e., by executing programs.

A tuner 12 selects one of a plurality of channels and receives desired program data. The program data (digital data) received by the tuner 12 is transmitted to the processor 11 and decoded therein. According to one embodiment of the invention, the program data is encoded in a MPEG2 format and transmitted from each broadcasting station. The processor 11 decodes the encoded data by programs stored in a memory 13.

A video signal of the program data decoded by the processor 11 is transmitted to an NTSC controller 14. The NTSC controller 14 causes the video signal to be displayed in a monitor 15. On the other hand, an audio signal of the program data is converted to an analog signal by an audio digital-to-analog converter (DAC) 16, and the converted analog signal is output through a loudspeaker 17.

When the digital television set 10 is performing the TV recording function, the processor 11 does not decode the program data transmitted from the tuner 12, but causes the encoded program data to be stored in the hard disk drive (HDD) 19 via an ATA interface section (ATA I/F) 18. The processor 11 executes the process relating to the TV recording function also by the programs stored in the memory 13.

When the digital television set 10 is performing the wireless TV function, the processor 11, if necessary, subjects the encoded program data to a convert process to convert the transmission rate of the program data transmitted from the tuner 12 to a specified transmission rate for wireless transmission. Thereafter, the processor 11 sends out the program data through a wireless device 21 via a communication controller 20. The subject of the wireless TV function is not limited to the program data transmitted from the tuner 12 but may be program data stored in the hard disk drive (HDD) 19. Thus, the user can watch a recorded program through a personal computer or the like in another room, as well as an on-air program. The processor 11 executes the process relating to the wireless TV function also by the programs stored in the memory 13.

The processor 11 comprises an arithmetic section 11A to execute the programs stored in the memory 13, and a temperature sensor 11B to measure an internal temperature of the processor 11, which is related to the heat generated from the processor 11 based on the operation status of the arithmetic section 11A. Information on the temperature measured by the temperature sensor 11B is supplied to a FAN/temperature controller 22. The FAN/temperature controller 22 controls the driving of a cooling fan 22 to cool the processor 11 based on the temperature information supplied from the temperature sensor 11B.

When the rotation rate of the cooling fan 23 reaches a predetermined value, the FAN/temperature controller 22 determines that a temperature abnormality has occurred. A "temperature abnormality" is generally known as a condition where the temperature of a heat-generating component (e.g. processor 11) exceeds a predetermined threshold temperature. Instead of further increasing the rotation rate of the cooling fan beyond the predetermined rotation rate, the FAN/temperature controller 22 interrupts the processor 11 to notify it of the temperature abnormality.

FIG. 2 is a block diagram showing an exemplary configuration of software operated in the digital television set 10. As shown, the digital television set 10, features the following software: an operating system 100, a device driver group 101 and an environment setting section (e.g., environment setting program) 102. The operating system 100 is a basic program, which executes resource management. The device driver group 101 drives hardware, such as, peripherals for example, by software. The environment setting program 102 is a utility, with which the user arbitrarily sets an operation as a system. A plurality of application programs 103-105, including a video processing program (referred to as "Application 1") 103, are also operated in the digital television set 10. In this description, it is assumed that the program to realize the TV function corresponds to Application 1.

When the FAN/temperature controller 22 detects a temperature abnormality, an interruption generating system 101A, a device driver which drives the FAN/temperature controller 22, generates an interruption (also referred to as an "interrupt") and notifies the operating system 100 of the temperature abnormality. Upon receipt of the notification, the operating system 100 executes the system control including a stop of the application program in order to handle the temperature abnormality. To execute the system control at the occurrence of the temperature abnormality, the operating system 100 has a task management section 100A and a task management table 100B.

When the temperature abnormality occurs, the task management section 100A carries out control to reduce the load of the arithmetic section 11A in order to suppress the heat of the processor 11. More specifically, the task management section 100A forcibly stops a program that does not require real-time execution of all application programs in operation.

The task management table 100B stores information, which indicates whether each application program requires real-time execution. This allows the task management section 100A to temporally halt a program that does not require real-time execution with reference to the task management table 100B.

Referring to FIG. 3, an exemplary, detailed configuration of the task management table 100B is shown. Herein, the column "Real-time execution" shows that a first and third application (e.g., Application 1 and Application 3) require real-time execution, whereas Application 2 does not require real-time execution. Therefore, the task management section 100A forcibly stops Application 2, which does not require real-time execution. The task management section 100A performs the same control in respect of the other applications that are not shown. The task management section 100A records that Application 2 is in the forcible stop status (sleep) in the column "Status" of the task management table 100B. For example, an application program for accepting unattended recording of the TV recording function does not require real-time execution.

The FAN/temperature controller 22 periodically checks temperature information detected by the temperature sensor 11B. If the temperature abnormality is overcome by reducing the load of the arithmetic section 11A based on the forcible stop of the Application 2, the FAN/temperature controller 22 sends an interrupt to the task management section 100A after a preset time has elapsed. Therefore, perhaps after a further predetermined time has elapsed, the task management section 100A restores the application program (Application 2), which has been recorded as the forcible stop status in the task management table 100B, to a normal status.

If the temperature abnormality is not concluded although the Application 2 that does not require real-time execution has been forcibly stopped, the task management section 100A receives a subsequent notification of the temperature abnormality again by an interrupt. In this case, the task management section 100A controls one or more operational application programs that have not been forcibly stopped and require real-time execution. Such control maintains the real-time execution of the application program and reduces the load of the arithmetic section 11A. For illustrative purposes only, this control process will be described as controlling Application 1 associated with the TV function, that is, the video processing program 103.

As shown in FIG. 2, the video processing program 103 has an MPEG2 decoder section 103A, a filter 1 section 103B, a filter 2 section 103C, an image output section 103D and a filter 1' section 103E. Program data transmitted from the tuner 12 is normally decoded by the MPEG2 decoder section 103A, and subjected to two filtering processes for noise removal and image correction in the filter 1 section 103B and the filter 2 section 103C. Then, the processed image is displayed by the image output section 103D. On the other hand, when the temperature is abnormal, the video processing program 103 is shifted to the following operation states under the control of the task management section 100A to reduce the load of the arithmetic section 11A.

Firstly, when the MPEG2 decoder section 103A decodes the program data transmitted from the tuner 12, it lowers the image quality from HD (high density) to SD (standard density), i.e., a high quality level to a standard level (HD/SD). Secondly, of the two filtering processes for noise removal and image correction, the first filtering process is executed by the filter 1' section 103E instead of the filter 1 section 103B. The filter 1' section 103E performs a simpler and lower-accuracy process than the filter 1 section 103B. Moreover, the second filtering process by the filter 2 section 103C is omitted. By the above first and second measures, the required real-time execution is maintained, while the required amount of process, i.e., the load of the arithmetic section 11A, is reduced. The task management section 100A records that the measures have been taken in the column "Status" of the task management table 100B (HD/SD).

As regards the simplification and omission of the above filtering processes, at least one of them may be performed. Further, when the image quality is lowered from the high-quality level to the standard level, the video processing program 103 may notify the user of that matter, and record the encoded program data transmitted from the tuner 12 in the hard disk drive (HDD) 19 automatically or in accordance with instructions or setting by the user, in parallel to the decoding process described above. In this case, the user can watch the images of the standard level for the time being, and later watch the images of the high-quality level recorded in the hard disk drive (HDD) 19.

When the temperature abnormality is overcome through the above measures, the task management section 100A restores the application program (Application 1), which has been recorded in the task management table 100B as had been subjected to the measures (and requires real-time execution), to the normal status. Thereafter, it restores the application program (Application 2), which has been recorded in the task management table 100B as being in the forcible stop status (and does not require real-time execution), to the normal status.

If the temperature abnormality is not still overcome through the above measures, the task management section 100A finally forces the application programs, which require real-time execution, to stop in the order of lower priority of the real-time execution.

As an illustrative example, in the task management table 100B shown in FIG. 3, the priorities of the real-time execution are indicated in the column "Priority". In this embodiment, it is assumed that the number "1" is assigned to the highest priority and the numbers in ascending order are respectively assigned to the lower priorities. Thus, the task management section 100A determines that Application 1 has a higher priority than Application 3. Therefore, it forcibly stops Application 3. As regards the priority, for example, the TV function for watching a TV program in front of the television set is given a higher priority than the wireless TV function for watching a TV program through a personal computer in another room.

The measures to handle the temperature abnormality as described above are started at the time when the FAN/temperature controller 22 detects that the rotation rate of the cooling fan 23 reaches a predetermined level, and sends the interrupt notification. Therefore, if the rotation rate of the cooling fan 23 as the upper limit reference value is set to a high value, the above-described measures by the application programs are suppressed to a minimum, though the noise generated by the cooling fan 23 is high. On the other hand, if the rotation rate is set to a low value, the noise generated by the cooling fan 23 is suppressed to a minimum by taking the measures by the application programs described above.

Based on this point, the environment setting program 102 presents a setting screen 150 as shown in FIG. 4, thereby assisting the user in arbitrarily setting the rotation rate of the cooling fan 23 as the upper limit reference value. The setting screen 150 presented by the environment setting program 102 has two input areas of a mode setting field 200 and a time zone setting field 210. The two input areas are used exclusively and selectively.

In the field 200, "Daytime Mode" or "Nighttime Mode" is selected and applied instantly. The rotation rate of the cooling fan 23 of FIG. 1 as the upper limit reference value is set to a high level in the "Daytime Mode", and a low level in the "Nighttime Mode". Thus, the user can select, depending on the circumstances, "Daytime Mode" in the case where the noise by the cooling fan is permitted to a certain degree, or "Nighttime Mode" in the case where the noise by the cooling fan 23 of FIG. 1 should be suppressed to a minimum.

In the field 210, the time zone, to which each of "Daytime Mode" and "Nighttime Mode" is applied, can be set in advance. The user inputs the start time and the end time of applying "Nighttime Mode" in this field, so that "Nighttime Mode" is automatically applied to that time zone, and "Daytime mode" in the other time zone.

Contents on the setting screen 150 are transferred from the environment setting program 102 to the operating system 100 and managed by the operating system 100. The operating system 100 sets the setting contents to the FAN/temperature controller 22 via the device driver 101 for the FAN temperature controller 22.

Operation sequences of the fan/temperature control of the digital television set 10 will be described below with reference to FIGS. 5 to 7.

Figure 5:
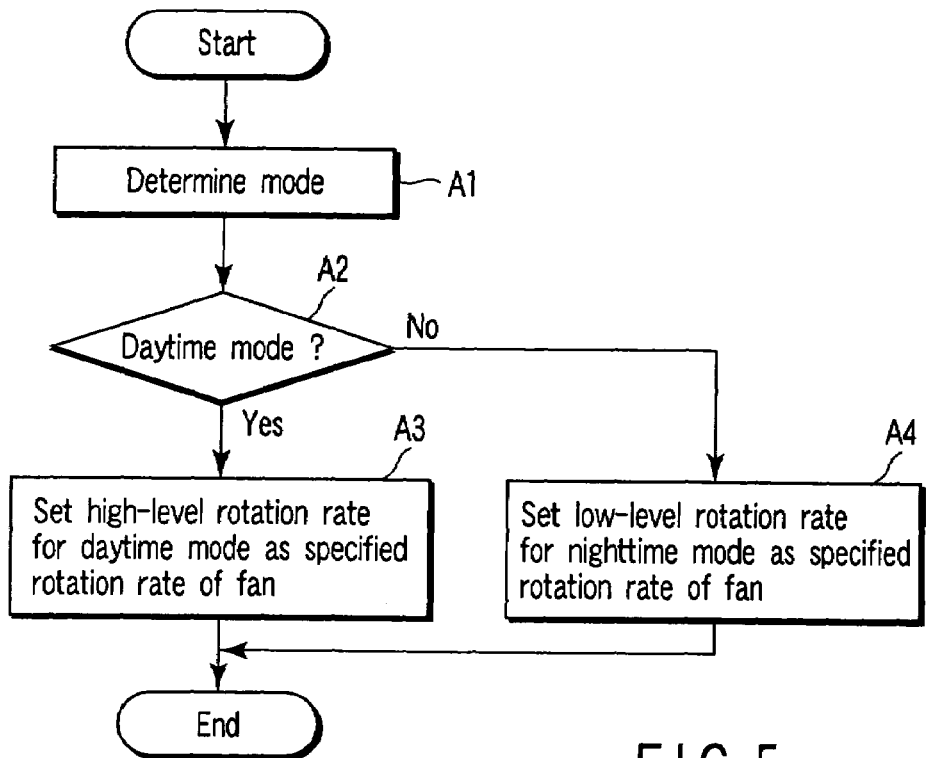
FIG. 5 is a first exemplary flowchart showing procedures relating to fan/temperature control of the digital television set of the embodiment.
Figure 6:
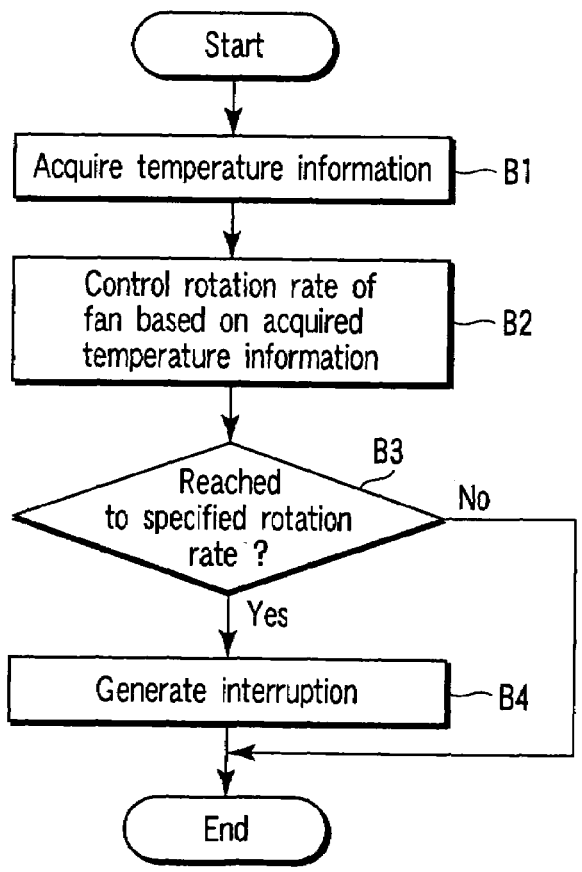
FIG. 6 is a second exemplary flowchart showing procedures relating to the fan/temperature control of the digital television set of the embodiment.

The operating system 100 first determines whether "Daytime Mode" or "Nighttime Mode" should be applied at present (block A1 in FIG. 5). If it is determined that "Daytime Mode" should be applied (YES in block A2 in FIG. 5), the high-level rotation rate for "Daytime Mode" is set in the FAN/temperature controller 22 via the device driver 101 (block A3 in FIG. 5).

On the other hand, if it is determined that "Nighttime Mode" should be applied (NO in block A2 in FIG. 5), the operating system 100 sets the low-level rotation rate for "Nighttime Mode" in the FAN/temperature controller 22 via the device driver 101 (block A4 in FIG. 5).

Thus, the specified rotation rate is set in the FAN/temperature controller 22. The FAN/temperature controller 22 periodically acquires temperature information from the temperature sensor 11B (block B1 in FIG. 6), and controls the rotation rate of the cooling fan 23 based on the acquired temperature information (block B2 in FIG. 6). If the rotation rate of the cooling fan 23 reaches the specified rotation rate (YES in block B3 in FIG. 6), the FAN/temperature controller 22 determines that temperature abnormality occurs, and notifies the operating system 100 of this matter by generating an interruption (block B4 in FIG. 6).

Figure 7:
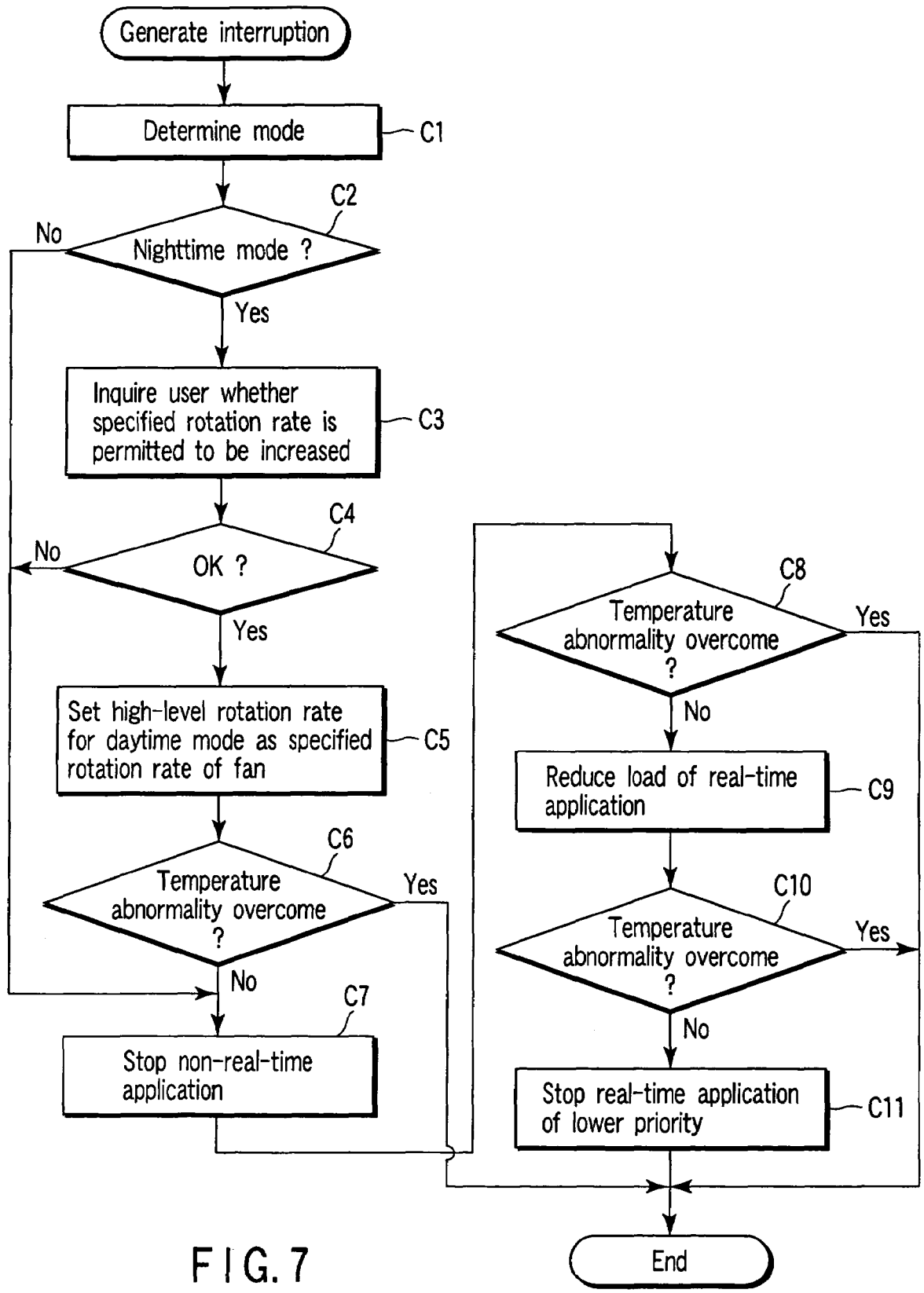
FIG. 7 is a third exemplary flowchart showing procedures relating to the fan/temperature control of the digital television set of the embodiment.

Upon receipt of the notification by interruption, the operating system 100 first determines whether the mode currently applied is "Daytime Mode" or "Nighttime Mode" (block C1 in FIG. 7). If "Nighttime Mode" is applied, that is, the low-level rotation rate is set in the FAN/temperature controller 22 (YES in block C2 in FIG. 7), the operating system 100 inquires the user whether it is permitted to switch the setting to the high-level rotation rate for "Daytime Mode" (block C3 in FIG. 7). If the operating system 100 receives approval instructions from the user (YES in block C4 in FIG. 7), it switches the setting of the FAN/temperature controller 22 to the high-level rotation rate for "Daytime Mode" (block C5 in FIG. 7). If the temperature abnormality is overcome by increasing the cooling capacity of the cooling fan (YES in block C6 in FIG. 7), the operating system 100 terminates the process caused by the interruption.

If the temperature abnormality is not overcome by increasing the cooling capacity of the cooling fan (NO in block C6 in FIG. 7), if the currently applied mode is "Daytime Mode" (NO in block C2 in FIG. 7), or if the approval instructions for the switching is not obtained from the user (NO in block C4 in FIG. 7), then the operating system 100 forcibly stops an application program that does not require real-time execution (block C7 in FIG. 7). If the temperature abnormality is overcome by decreasing the load of the arithmetic section 11A (YES in block C8 of FIG. 7), the operating system 100 terminates the process caused by the interruption.

If the temperature abnormality is not overcome by the above measure (NO in block C8 in FIG. 7), the operating system 100 takes the measure of reducing the load by simplifying the process or omitting a part of the process in respect of an application program that requires real-time execution (C9 in FIG. 7). If the temperature abnormality is not overcome by this measure (NO in block C10 in FIG. 7), the operating system 100 at last forcibly stops an application program of a lower priority selected from the application programs that require real-time execution (block C11 in FIG. 7).

As described above, in the digital television set 10, if the temperature abnormality of the processor occurs, it can be handled by appropriate software control in consideration of the convenience of the user: for example, by determining whether the noise of the cooling fan 23 of FIG. 1 is permitted to a certain degree, giving a higher priority to an application program that requires real-time execution than an application program that does not require real-time execution, and maintaining the real-time execution as far as possible.

In the embodiment described above, the priorities of the application programs that require real-time execution are managed by means of the task management table 100B. However, the priorities may be fixed as a specification of the digital television set 10 or may be arbitrarily set by the user by means of the environment setting program 102. Further, the forcible stop of an application program that does not require real-time execution, the process of simplifying or partially omitting an application program that requires real-time execution, or the forcible stop of an application program of a lower priority selected from the application programs that require real-time execution are not necessarily carried out in the order as described above. Not all of these processes are necessarily carried out. Which of them and in what order should be carried out may be arbitrarily set by the user by means of the environment setting program 102.

For instance, according to one embodiment of the invention, all non-real-time applications may be forcibly stopped before altering functionally of a real-time application. Thereafter, certain functionality of real-time applications may be altered before stopping any real-time application. However, in another embodiment, some real-time applications may be forcibly stopped before altering the functionality of some real-time applications.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
   a processor;
   a temperature sensor that detects a temperature of the processor;
   a cooling fan;
   a fan controller in communication with the temperature sensor and the cooling fan, the fan controller to control a rotation rate of the cooling fan based on the temperature detected by the temperature sensor; and
   a task management section that (i) whether each of a plurality of programs executed by the processor requires real-time execution and (ii) stops a program determined to not require real-time execution when the rotation rate of the cooling fan reaches a specified rotation rate.

2. The information processing apparatus according to claim 1 further comprising a task management table that stores information of each of the plurality of programs, the information including a priority of operation and an indication whether a program requires real-time execution.

3. The information processing apparatus according to claim 2, wherein the task management section and the task management table are part of an operafing system.

4. The information processing apparatus according to claim 1, wherein the task management section determines an operation status of each of the plurality of programs and alters functionality of a program, selected from a group of programs that require real-time execution and determined to be in operation.

5. The information processing apparatus according to claim 4, wherein the task management section alters functionality of the program, being a video processing program, by changing an image quality of encoded video information, which is to be reproduced by decoding, from a high-quality level to a standard level, and causes the encoded video information to be stored in a memory device in parallel with the decoding.

6. The information processing apparatus according to claim 1, wherein the task management section determines priorities of real-time execution for a group of programs of the plurality of programs that require real-time execution, and stops a program whose priority of real-time execution is determined to be lower than other programs of the group of programs.

7. The information processing apparatus according to claim 1, further comprising an environment setting section that sets operation environment to one of a first mode, in which the specified rotation rate of the cooling fan is set to a first value, and a second mode, in which the specified rotation rate is set to second value lower than the first value.

8. The information processing apparatus according to claim 7, wherein the environment setting section sets time zones to which the first mode and the second mode are respectively applied.

9. The information processing apparatus according to claim 7, wherein the task management section inquires whether the second mode can be changed to the first mode when the rotation rate of the cooling fan reaches the specified rotation rate while the second mode is set, and withholds controlling with respect to the plurality of programs and instructs the environment setting section to change to the first mode if the change to the first mode is permitted.

10. The information processing apparatus according to claim 1, wherein the task management section is a part of an operating system.

\* \* \* \* \*